Figure 1:
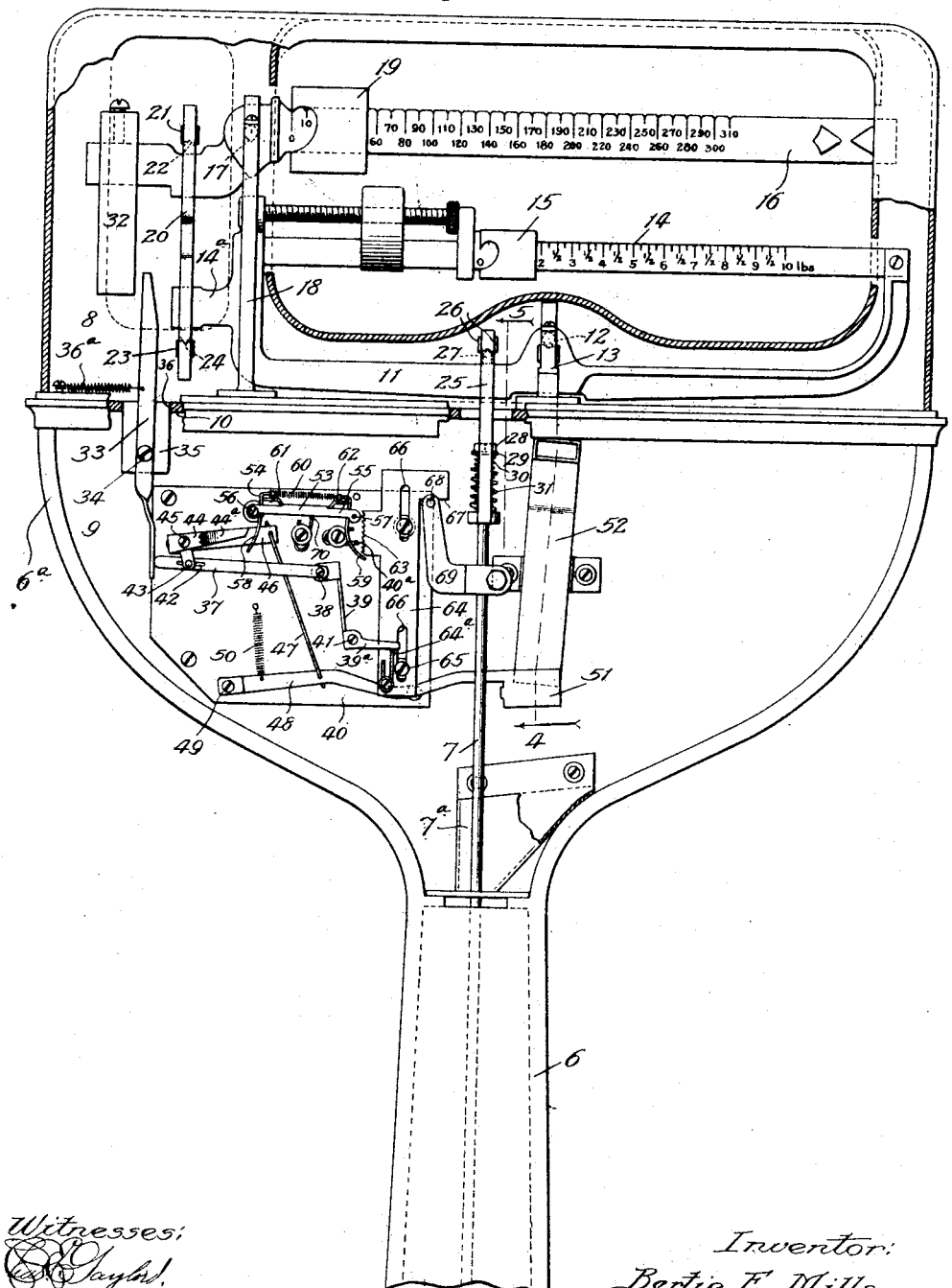

B. E. MILLS.
WEIGHING SCALE.
APPLICATION FILED AUG. 2, 1915.

1,214,056.

Patented Jan. 30, 1917.
3 SHEETS—SHEET 1.

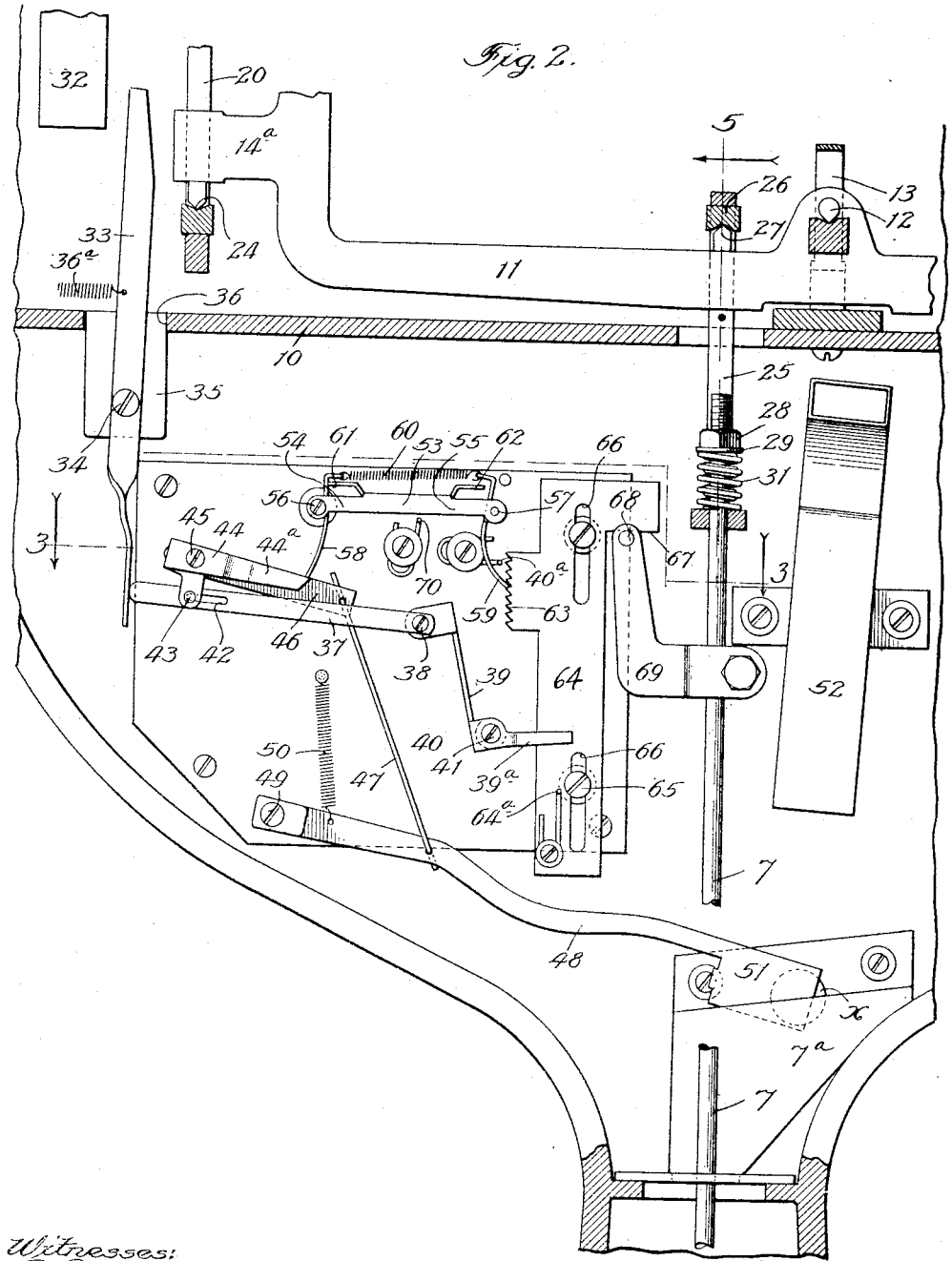

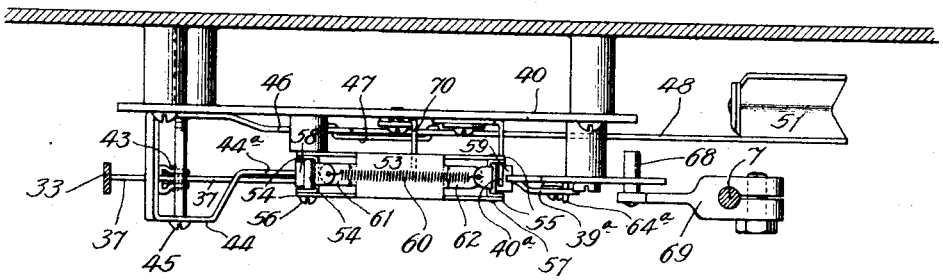

UNITED STATES PATENT OFFICE.

BERTIE E. MILLS, OF CHICAGO, ILLINOIS, ASSIGNOR TO MILLS NOVELTY COMPANY, OF CHICAGO, ILLINOIS, A CORPORATION OF ILLINOIS.

WEIGHING-SCALE.

1,214,056.  Specification of Letters Patent.  Patented Jan. 30, 1917.

Application filed August 2, 1915. Serial No. 43,206.

*To all whom it may concern:*

Be it known that I, BERTIE E. MILLS, a citizen of the United States, residing at Chicago, in the county of Cook and State of Illinois, have invented a new and useful Improvement in Weighing-Scales, of which the following is a specification.

My object is to provide improvements in weighing scales of the coin-controlled type to the end that the weighing mechanism cannot be operated to accurately designate the weight imposed on the scale platform, until a coin of the proper denomination, or other token, has been deposited in the machine, and other objects as will be apparent from the following specification.

Referring to the accompanying drawings, Figure 1 is a view in front elevation, of a weighing scale constructed in accordance with my invention, certain portions thereof being shown in elevation and other parts broken away the better to disclose details, the machine being illustrated in normal condition. Fig. 2 is an enlarged view in elevation of a portion of the mechanism illustrated in Fig. 1, this view showing the positions assumed by the coin-controlled mechanism after a coin has been inserted into operative position in the machine. Fig. 3 is a section taken at the irregular line 3 on Fig. 2 and viewed in the direction of the arrow. Fig. 4 is a section taken at the line 4 on Fig. 1 and viewed in the direction of the arrow; and Fig. 5, a section taken at the lines 5 on Figs. 1 and 2 and viewed in the direction of the arrows.

The general features of the illustrated scale mechanism are of the beam type are in accord with common practice, and a general description thereof will therefore suffice. The upper portion of the upright section of the scale casing is represented at 6, the lower end of this section, according to common practice, rising from a base on which the weighing platform, not shown, is supported. The upright 6 is hollow and has extending upwardly therethrough the rod 7 which would be so connected with the weighing platform, in accordance with common practice, as to be pulled downwardly when weight is imposed on the weighing platform. The upper part of the casing 6 is expanded as indicated at 6ª, the space therein provided being divided into two compartments 8 and 9, by a partition 10. The lever mechanism of the scale is located in the upper compartment 8 and in the construction illustrated involves a yoke-shaped bar 11 with its arms extending upwardly and having pivotal connection, to rock in a vertical plane, as indicated at 12, with a standard 13 secured to the partition 10; an auxiliary scale bar 14 secured at its ends to the upper ends of the yoke bar 11, with a slidable counterpoise 15 thereon, the bar 11 being provided with a lug 14ª, a main scale-bar 16 pivotally supported to rock in a vertical plane, as indicated at 17, on an upright bar 18 located in the compartment 8 and rising from the partition 10, the bar 16 being provided with a counterpoise 19 slidable thereon; and a link 20 connecting the bars 11 and 16. The link 20 has openings in its upper and lower ends through which the adjacent ends of the bars 11 and 16 extend, the link 20 resting at a bearing 21 thereon, on a knife-edge 22 carried by the bar 16 and engaging at a bearing 23 with a knife-edge 24 located above the latter and secured to the underside of the lug 14ª. The rod 7 is connected with the lever mechanism just described through the medium of a yoke 25 through which the bar 11 extends, this yoke carrying a bearing 26 which bears against a knife-edge 27 on the upper surface of the bar 11. The upper end of the rod 7 passes upwardly through the lower end of the yoke-member wherein it carries a nut 28 and washer 29 between which latter and the bottom of the yoke-member a, relatively-light, coiled spring 30 is confined, a second, relatively heavy, coiled spring of greater diameter than the spring 30 and somewhat shorter also encircling the rod 7 and bearing at its lower end against the lower end of the yoke 25.

It will be understood from the foregoing description that the lowering of the rod 7, as by a load being placed on the weighing platform, operates through the spring-section described, to rock the bars 11 and 16 in an anti-clockwise direction in opposition to the action of the counterpoises 15 and 19.

In accordance with my invention provision is made for preventing the weighing mechanism from operating in the manner in which it should to indicate the true weight of the object imposed on the weighing platform, unless a coin of the proper denomination, or a suitable token, has been deposited in the machine. In the preferred illustrated embodiment of my invention this is accomplished by providing means which exert force against the weighing levers, rendering them inoperative for accurate weighing, unless the proper coin or other token has been inserted in the machine.

In accordance with the preferred embodiment of my invention, I provide on the bar 16 a block 32, coöperating with which is a lever 33 pivotally supported, as indicated at 34, on a lug 35 depending from the edge of an opening 36 in the partition 10, through which opening the said lever extends. The lever 33, when its controlling mechanism is in the position hereinafter described, is adapted, under the action of a coiled spring 36ª, to press against the block 32, thereby exerting force on the lever 16 tending to turn it in a clockwise direction. The lower end of the lever 33 extends into the path of movement of a link 37 pivotally connected, as indicated at 38, with the upper arm of a bell-crank-lever 39 pivoted to a plate 40, as indicated at 41. The end of the link 37 adjacent the lever 33 contains a slot 42 in which a pin 43 carried on a yoke 44, extends. The yoke 44 is pivotally supported on a pin 45 connected with the plate 40, one of the arms 46 of the yoke 44 being connected by a link 47 with a lever 48 pivotally supported at one end on a plate 40, as indicated at 49, this lever coöperating with the coiled spring 50 connected with it and with the plate 40 and tending to return this lever to the normal position, represented in Fig. 1, when operated as hereinafter described. The free end of the lever 48 is equipped with a trough 51 adapted to receive coins introduced into the machine through a chute 52, the chute 52 extending at its lower end into the space between the side walls of the trough 51.

Adjacent the yoke 44 is a rock-member 53 the ends of which terminate in spaced arms 54 and 55. The rock-member 53 is pivotally supported at its arms 54 on a pin 56 on the plate 40 and carries in its other arms 55, a pin 57. Pivoted on the pins 56 and 57 are detents 58 and 59, respectively, the lower ends of which are deflected in an outward direction as represented, a spring 60 connected at its ends with the upper portions of the detents 58 and 59 tending to swing them outwardly at their lower ends and normally holding them against stops 61 and 62, respectively, on the member 53. The detent 58 coöperates with the arm 44ª of the yoke 44 in the manner hereinafter described, and the detent 59 with a rack 63 provided on an edge of a gravity-bar 64 slidably confined on the plate 40 through the medium of pins 65 on said plate extending through slots 66 in the bar 64. The upper end of the bar 64 is provided with a shoulder 67 which rests upon a pin 68 extending laterally from an arm 69 rigidly secured to the rod 7 to move therewith, and this bar carries a pin 64ª adapted to coöperate with the arm 39ª of the lever 39.

The machine is represented in normal position in Fig. 1. In this position of the machine the upper end of the pin 64ª presses upwardly against the arm 39ª and through the medium of the link 37 holds the lever 33 out of engagement with the block 32, in opposition to the spring 36ª, in which position the parts of the weighing mechanism are unobstructed; the lever 48, under the action of the spring 50 is held in a position in which the trough straddles the lower end of the coin-chute 52; the yoke-member 44, by reason of the link 37, extends in a position in which its arm 44ª is above the lower end of the detent 58; the member 53 bears downwardly against a stop 70 on the plate 40; the detent 59 extends below the lower end of the rack 63; and the slide 64 is held in the raised position indicated by the arm 69. As soon as an object is imposed on the weighing-platform, the rod 7 lowers, thus lowering the pin 68 and permitting the slide 64 to descend, which moves the pin 64ª downwardly, permitting the lever 39 to rock in a clock-wise direction under the action of the spring-pressed lever 33, which latter rocks in an anti-clockwise direction, and under the action of the spring 36ª bears yieldingly against the face of the block 32 and exerts against the latter pressure tending to swing the bars 14 and 16 downwardly at the right-hand ends in Fig. 1. Thus the scale will be out of balance and will not operate to accurately indicate the weight of the object on the platform.

Upon depositing a coin or other suitable token into the chute 52 by inserting it through a coin-slot in the front side of the casing of the machine, the pressure of the lever 33 against the block 32 is removed, permitting the scale-mechanism to be operated without interference, the operation of the coin-controlled mechanism, under the condition just stated, being as follows: The coin, which is represented at $x$, in passing through the chute 52 drops into the trough 51, and by reason of its weight operates to swing the lever 48 downwardly on its pivot 49 and also rock the member 44 on its pivot 45 in a clockwise direction by reason of the link-connection 47, the action of the yoke-member 44, as stated, causing the link 37 to be shifted to the left in Fig. 1, which rocks the lever 33 in a clockwise direction against the resistance of the spring 36ª, to the position illustrated in Fig. 2, wherein it is removed from the path of movement of the block 32. The movement of the yoke-member 44, as described, causes its arm 44ª to wipe over the detent 58, the latter springing back into a position for releasably holding the yoke-member 44 in depressed condition, and the lever 33 in a position in which it does not obstruct the movement of the scale-mechanism, Fig. 2. When the lever 48 has rocked sufficiently to move the yoke-member 44 to position for engaging with the detent 58 as stated, the trough 51 will incline sufficiently to permit the coin $x$ to discharge therefrom and into a chute 7ª, which opens into a coin-receptacle 7ᵇ. The descent of the rod 7 as above stated, to actuate the scale-mechanism, simultaneously lowers the pin 68 which permits the plate 64 to descend, the rack 63 in this movement wiping across the lower end of the detent 59, which latter engages one of the teeth opposite it when the plate 64 comes to rest (Fig. 2). When the object on the platform is removed, the rod 7 automatically rises to normal position, and carries upwardly with it the plate 64, which, by reason of the engagement of the detent 59 with one of the teeth of the rack 63, automatically swings the member 53 upwardly on its pivot 56, this disengaging the detent 58 from the arm 44ª, whereupon, under action of the spring 36ª, the lever 33 and the parts controlling it, as hereinbefore described, return to normal position, Fig. 1, a pin 40ª secured to and extending laterally from the plate 40 between the rack 63 and detent 59, operating to insure the disengagement of this detent from the teeth in the return of the slide 64 to normal raised position. In the final upward movement of the plate 64 the stop 64ª engages the arm 39ª, thus rocking the bell crank 39 in an anti-clockwise direction which shifts the link 37 to the left in Fig. 2, and rocks the lever 33 to normal condition, (Fig. 1) in which condition the lever is out of a position affecting the balance of the scale.

The feature of providing the two springs 30 and 31 as stated is desirable as thereby the rod 7 descends a considerable distance when a light object rests on the platform, which permits of the desirable movement of this rod to insure the movement of the lever 33 to a position in which it affects the balance of the scale, and this rod thereafter descends farther a slight distance only, when a heavier object is placed on the platform, bringing the heavier spring 31 into action.

The detents are preferably so constructed and arranged that when the bar 64, after engaging the detent 59, moves upwardly a slight distance, it will disengage the detent 58 from the member 44 and thus permit the lever 33 to return to a position for disturbing the balance of the scale, this feature being desirable to prevent the operation of the machine to weigh more than one person with each coin-insertion.

While I have illustrated and described a particular embodiment of my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. In a weighing-scale, the combination with weighing mechanism, of means movable into and out of position for preventing the scale from weighing, coin-controlled means operating automatically, upon the engagement therewith of a coin under its own weight, inserted into the machine, to cause said first-named means to be in a position in which they do not interfere with the operation of the scale mechanism, catch mechanism for holding said first-named means in said last referred to position, and means, controlled by the movement of said weighing mechanism to normal position upon the removal of the weight from the scale, for actuating said catch mechanism to permit said first-named means to return to a position for preventing the scale from weighing.

2. In a weighing-scale, the combination with weighing mechanism, of means movable into and out of position for preventing the scale from weighing, coin-controlled means operating automatically, upon the engagement therewith of a coin under its own weight, inserted into the machine, to cause said first-named means to be in a position in which they do not interfere with the operation of the scale mechanism and automatically release the coin in the said movement of said last-named means, releasable catch mechanism for holding said first-named means in said last referred to position, and means, controlled by the movement of said weighing mechanism to normal position upon the removal of the weight from the scale, for actuating said catch mechanism to permit said first-named means to return to a position for preventing the scale from weighing.

3. In a weighing-scale, the combination with weighing mechanism of the beam-type and involving a balancing beam, of means movable into and out of position for preventing the scale from weighing, means operating to hold said first-named means normally in a position in which they will not interfere with the balancing of the scale when no weight is applied thereto, and coin-controlled means operating automatically, upon the engagement therewith of a coin under its own weight, inserted into the machine, to cause said first-named means to be in a position in which they do not interfere with the operation of the scale mechanism when a weight is on the scale.

4. In a weighing-scale, the combination with weighing mechanism, of means movable into and out of position for preventing the scale from weighing, means tending to move said first-named means to a position in which the scale is prevented from weighing, means controlled by said weighing mechanism and operating, when the latter is in normal position, to hold said first-named means in a position in which they will not interfere with the operation of said weighing mechanism, and coin-controlled means operating, when actuated, to prevent said first-named means from interfering with the operation of the weighing mechanism in the movement of the latter out of normal position.

5. In a weighing-scale, the combination with weighing mechanism, of means movable into and out of position for preventing the scale from weighing, means tending to move said first-named means to a position in which the scale is prevented from weighing, means controlled by said weighing mechanism and operating, when the latter is in normal position, to hold said first-named means in a position in which they will not interfere with the operation of said weighing mechanism, and coin-controlled means operating automatically upon the engagement therewith of a coin under its own weight, inserted into the machine, to cause said first-named means to be out of a position in which they interfere with the operation of the weighing mechanism in the movement of the latter out of normal position.

6. In a weighing-scale, the combination with weighing mechanism of the beam-type and involving a balancing beam, of means movable into and out of position for preventing the scale from weighing, means operating to hold said first-named means normally in a position in which they will not interfere with the balancing of the scale when no weight is applied thereto, coin-controlled means operating automatically, upon the engagement therewith of a coin under its own weight, inserted into the machine, to cause said first-named means to be in a position in which they do not interfere with the operation of the scale mechanism when a weight is on the scale, and releasable retaining means for holding said first-named means in said last referred to position.

7. In a weighing-scale, the combination with weighing mechanism, of means movable into and out of position for preventing the scale from weighing, means operating to hold said first-named means normally in a position in which they will not interfere with the balancing of the scale when no weight is applied thereto, coin-controlled means operating automatically, upon the engagement therewith of a coin under its own weight, inserted into the machine, to cause said first-named means to be in a position in which they do not interfere with the operation of the scale mechanism when a weight is on the scale, releasable retaining means for holding the said first-named means in said last referred to position, and means controlled by the movement of said weighing mechanism to normal position upon the removal of the weight from the scale, for actuating said retaining means to permit said first-named means to return to a position for preventing the scale from weighing.

8. In a weighing-scale, the combination with weighing mechanism, of means movable into and out of position for preventing the scale from weighing and tending to move to a position for preventing the scale from weighing, means controlled by said weighing mechanism and operating when the latter is in normal position to hold said first-named means in a position in which they will not interfere with the operation of said weighing mechanism, coin-controlled means operating when actuated to prevent the said first-named means from interferring with the operation of the weighing mechanism in the movement of the latter out of normal position, and releasable retaining means for holding said first-named means in said last referred to position.

9. In a weighing-scale, the combination with weighing mechanism, of means movable into and out of position for preventing the scale from weighing and tending to move to a position for preventing the scale from weighing, means controlled by said weighing mechanism and operating when the latter is in normal position to hold said first-named means in a position in which they will not interfere with the operation of said weighing mechanism, coin-controlled means operating when actuated to prevent the said first-named means from interfering with the operation of the weighing mechanism in the movement of the latter out of normal position, retaining means for holding said first-named means in said last referred to position, and means, controlled by the movement of said weighing mechanism to normal position, for actuating said retaining means to permit said first-named means to return to a position for preventing the scale from weighing.

10. In a weighing-scale, the combination with weighing mechanism, of means movable into and out of position for preventing the scale from weighing and tending to normally prevent the scale from weighing, means controlled by said weighing mechanism and operating when the latter is in normal position to hold said first named means in a position in which they will not interfere with the operation of said weighing mechanism, a coin-controlled member movable automatically by the engagement therewith of a coin under its own weight, inserted into the machine, into a position for causing said first-named means to be out of a position in which they interfere with the weighing mechanism when a weight is on the scale, retaining means for holding said member in said last-referred to position, and means, controlled by the movement of said weighing mechanism to normal position, for actuating said retaining means to permit said first-named means to return to a position for preventing the scale from weighing.

11. In a weighing scale, the combination with weighing mechanism, of means movable into and out of position for preventing the scale from weighing, means controlled by said weighing mechanism and operating when the latter moves to normal position to move said first-named means to a position in which they will not interfere with the operation of said weighing mechanism, coin-controlled means operating automatically upon the engagement therewith of a coin under its own weight, inserted into the machine, to cause said first-named means to be in a position in which they will not interfere with the operation of the weighing mechanism when a weight is on the scale, retaining means for holding said first-named means in said last-referred to position, and means, controlled by the movement of said weighing mechanism to normal position, for actuating said retaining means to permit said first-named means to return to a position for preventing the scale from weighing.

12. In a weighing-scale, the combination with weighing mechanism, of a shiftable member adapted to be moved into and out of a position in which it prevents the scale from weighing, yielding means tending to hold said member in said last referred to position, a second shiftable member, coin-controlled means operatively engaging said second member and operating automatically, when actuated, to shift the latter, means operated by said second member when shifted as stated, for moving said first-named member out of a position in which it interferes with the operation of the scale mechanism, a slide, means controlled by the position of said slide and releasable by movement of the latter, for releasably retaining said second member in said position, and means operated by said weighing mechanism for actuating said slide.

13. In a weighing-scale, the combination with weighing mechanism, of a pivotally supported lever adapted to be moved into and out of a position in which it prevents the scale from weighing, yielding means tending to hold said lever in said last-referred to position, a member supported to be rocked, coin-controlled means connected with said member and operating, when actuated, to automatically rock the latter, means operated by said member when actuated as stated, for moving said lever out of a position in which it interferes with the operation of the scale mechanism, a slide, means controlled by the position of said slide and releasable by movement of the latter, for releasably retaining said member in said position, and means operated by said weighing mechanism for actuating said slide.

14. In a weighing-scale, the combination with weighing mechanism, of a pivotally supported lever adapted to be moved into and out of a position in which it prevents the scale from weighing, yielding means tending to hold said lever in said last-referred to position, a member supported to be rocked, coin-controlled means connected with said member and operating, when actuated, to automatically rock the latter, means operated by said member when actuated as stated for moving said lever out of a position in which it interferes with the operation of the scale mechanism, a slide, means controlled by the position of said slide and releasable by movement of the latter, for releasably retaining said member in said position, means operated by said weighing mechanism for actuating said slide, and means actuated by said slide in the movement of the weighing mechanism to normal position, for moving said lever to a position in which it will not interfere with the weighing operation.

15. In a weighing-scale, the combination with weighing mechanism, of a pivotally supported lever adapted to be moved into and out of position for preventing the scale from weighing, yielding means for shifting said lever to said last-referred to position, a member supported to be rocked, a second member supported to be rocked, a bar pivotally connected with one of the arms of said second-named member and engaging said lever, said bar containing a slot, a pin on said first-named member extending into said slot and adapted to engage one of the walls of the latter, a pivotally supported lever connected with said first-named member and containing a coin-receiving trough adapted to receive a coin operating to actuate said first-named member, bar and said lever to a position in which said first-named lever does not interfere with the operation of the weighing mechanism, a detent device for holding said first-named member in the position to which it was moved by the action of the coin, a slide, means on said slide operating when the latter moves in one direction to release engagement of said detent with said second member, and its final movement in the same direction, to engage said second member and shift said first-referred to lever out of a position in which it interferes with the weighing mechanism, and means operated by said weighing mechanism for controlling the movement of said slide.

16. In a weighing-scale, the combination with weighing mechanism, of means movable into and out of position for preventing the scale from weighing, a shiftable device operating, when shifted, to move said first-named means to a position in which they will not interfere with the operation of the weighing mechanism, coin-controlled means for actuating said shiftable device, a rock member provided with detents one of which coöperates with said shiftable device for releasably holding it in a position for permitting the scale mechanism to operate, and means controlled by the weighing mechanism and coöperating with the other of said detents for releasing said shiftable device to permit the latter to return to normal position upon the movement of the weighing mechanism toward normal position.

17. In a weighing-scale, the combination with weighing mechanism, of means movable into and out of position for preventing the scale from weighing, a shiftable device operating, when shifted, to move said first-named means to a position in which they will not interfere with the operation of the weighing mechanism, coin-controlled means for actuating said shiftable device, a rock member provided with detents, one of which coöperates with said shiftable device for releasably holding it in a position for permitting the scale mechanism to operate, spring means connecting said detents, and means controlled by the weighing mechanism and coöperating with the other of said detents for releasing said shiftable device to permit the latter to return to normal position upon the movement of the weighing mechanism toward normal position.

18. In a weighing-scale, the combination with weighing mechanism, of means movable into and out of position for preventing the scale from weighing, a shiftable device operating, when shifted, to move said first-named means to a position in which they will not interfere with the operation of the weighing mechanism, coin-controlled means for actuating said shiftable device, a rock member provided with detents pivoted on said rock-member, spring means tending to spread said detents apart, one of said detents coöperating with said shiftable device and operating to releasably hold it in the position to which it is moved upon the operation of said coin-controlled means, and means controlled by said weighing mechanism coöperating with the other of said detents and operating to rock said rock-member to a position in which said first-referred to detent disengages from said shiftable device upon the return movement of the weighing mechanism to normal position.

19. In a weighing scale, the combination with weighing mechanism, of a lever pivotally supported to be moved into and out of a position in which it prevents the scale mechanism for weighing, a pivotally-supported member, a bar operatively connected with said member and adapted to engage one end of said lever, said bar containing a slot, a second member supported to be rocked and carrying a pin extending into said slot and adapted, when actuated, to shift said bar to shift said lever, a second, pivotally-supported, lever containing a pocket adapted to receive a coin inserted into the machine, spring means tending to hold said second lever in raised position, but yieldable under the weight of the coin inserted into said pocket, said pocket being constructed and arranged to permit the coin to discharge therefrom when said second lever is depressed, means connecting said second lever with said second member for rocking the latter, a rock-member, detents pivotally-supported on said rock member, a spring connecting said detents together tending to spread them apart, one of said detents engaging said second member when the latter is rocked by the action of said second lever as stated, for holding said first-named lever in a position in which it does not prevent the scale from weighing, a slide, and means whereby the movement of said slide is controlled by the position of said weighing mechanism, said slide being provided with a ratchet which coöperates with the other of said detents engaging therewith in the movement of the weighing mechanism under the action of a weight applied to the platform of the scale, and operating to rock the rock-member to a position in which the other of said detents disengages from said second member when said weighing mechanism moves toward normal position.

20. In a weighing-scale, the combination with weighing mechanism, of a lever pivotally supported to be moved into and out of a position in which it prevents the scale mechanism from weighing, a pivotally-supported member, a bar operatively connected with said member and adapted to engage one end of said lever, said bar containing a slot, a second member supported to be rocked and carrying a pin extending into said slot and adapted, when actuated, to shift said bar to shift said lever, a second, pivotally-supported lever containing a pocket adapted to receive a coin inserted into the machine, spring means tending to hold said second lever in raised position, but yieldable under the weight of the coin inserted into said pocket, said pocket being constructed and arranged to permit the coin to discharge therefrom when said second lever is depressed, means connecting said second lever with said second member for rocking the latter, a rock-member, detents pivotally-supported on said rock-member, a spring connecting said detents together tending to spread them apart, one of said detents engaging said second member when the latter is rocked by the action of said second lever as stated, for holding said first-named lever in a position in which it does not prevent the scale from weighing, a slide, means whereby the movement of said slide is controlled by the position of said weighing mechanism, said slide being provided with a ratchet which coöperates with the other of said detents engaging therewith in the movement of the weighing mechanism under the action of a weight applied to the platform of the scale, and operating to rock the rock-member to a position in which the other of said detents disengages from said second member when said weighing mechanism moves toward normal position, and means operated by said slide in the movement of said weighing mechanism to normal position for actuating said first-named member to move said first-named lever to a position in which it will normally be out of a position in which it interferes with the operation of the scale mechanism.

21. In a weighing-scale, the combination of weighing mechanism, including indicating means, means movable into and out of position for preventing the scale from weighing, means controlling the position of said first-named means and including a member operated by said weighing mechanism, said weighing mechanism, intermediate said indicating means and the point of connection of said member with said weighing mechanism, having a single spring connection formed of a plurality of springs of different lengths arranged to cause the longer one of said springs to be first engaged and support the load and thereafter the shorter one engaged while maintaining the engagement of the longer one of said springs, for the purpose set forth.

22. In a weighing-scale, the combination of weighing mechanism, including indicating means, means movable into and out of position for preventing the scale from weighing, means controlling the position of said first-named means and including a member operated by said weighing mechanism, the said weighing mechanism, intermediate said indicating means and the point of connection of said member with said weighing mechanism, having a single spring connection formed of a plurality of springs of different lengths and stiffness, the longer spring being lighter, arranged to cause the longer one of said springs to be first engaged and support the load and thereafter the shorter one engaged while maintaining engagement of the longer one of said springs, for the purpose set forth.

BERTIE E. MILLS.

In presence of—
E. C. CHALDER,
JAMES HOROWITZ.

Copies of this patent may be obtained for five cents each, by addressing the "Commissioner of Patents, Washington, D. C."